United States Patent [19]

Orth, Jr.

[11] 4,160,847

[45] Jul. 10, 1979

[54] PROCESS OF IMPROVING THE FREEZE-THAW STABILITY OF FISH BAIT

[76] Inventor: George O. Orth, Jr., 10612 Riviera Pl. NE., Seattle, Wash. 98125

[21] Appl. No.: 776,139

[22] Filed: Mar. 10, 1977

[51] Int. Cl.$^2$ .................................................. A23B 4/00
[52] U.S. Cl. ........................................ 426/1; 426/332; 426/486; 426/524; 426/643
[58] Field of Search .................. 426/1, 2, 302, 303, 426/304, 310, 426, 478, 513, 289, 524, 468, 486, 293, 331, 332, 532; 8/94.11

[56] References Cited

U.S. PATENT DOCUMENTS

| | | | |
|---|---|---|---|
| 2,693,417 | 11/1954 | Orth | 426/1 |
| 3,904,774 | 9/1975 | Dymsza | 426/426 X |

OTHER PUBLICATIONS

Rose et al., "Condensed Chemical Dictionary" 7th Edition, 1970, pp. 791-792.

*Primary Examiner*—R. B. Penland
*Attorney, Agent, or Firm*—Seed, Berry, Vernon & Baynham

[57] ABSTRACT

A process is disclosed to improve the freeze-thaw stability of fish bait, such as herring, by impregnating the fish by vacuum, pressure or a combination of vacuum and pressure with a water soluble, non-toxic glycol to replace a part of the water in the fish with the glycol. The fish bait are subsequently drained and may be packed and frozen for future use.

3 Claims, No Drawings

PROCESS OF IMPROVING THE FREEZE-THAW STABILITY OF FISH BAIT

BACKGROUND OF THE INVENTION

1. Field of the Invention

This invention relates to a method of improving the freeze-thaw stability of fish bait.

2. Prior Art Relating to the Disclosure

In the sports and commercial fishing industry it is common practice to preserve fish bait by freezing the bait to render them usable at a future time with a minimum of deterioration. Fish, such as herring and opelu (mackerel) and other bait fish, when thawed after being frozen, tend to become soft and are easily stripped off of the bait hook during trawling. This is frustrating to the sports fishermen and costly to the commercial fishermen. It is the usual practice for fishermen to thaw a frozen package of bait at room temperature for immediate use. In the course of one or two hours, the thawed fish bait becomes soft and will not stay on the hooks.

Formaldehyde has long been used to preserve tissue and toughen up protein material by "tanning." Formaldehyde, however, is toxic and cannot be used without killing the fish that consume the bait which are not caught. In addition to formaldehyde, solutions of borax, brine, sugar, milk and other treating solutions have been used through the years for preservation. One non-chemical method used today to improve the freeze-thaw stability of herring is to impound the herring from one to two weeks without food to starve them in order to reduce the enzymatic activity in their stomachs. They are then electrically killed and freeze-packed. This method is costly in terms of loss of fish and impounding time, especially when fish are running and the need for packing is immediate. For this reason a great many herring are freeze-packed green (i.e. freshly caught).

U.S. Pat. No. 2,693,417, issued Nov. 2, 1954, describes the use of triethylene glycol and other related materials as a solution preservative for non-frozen fish after treatment with formaldehyde. This treatment and preservation was designed to keep the fish bait for long periods of time at room temperature. In practice the process was limited to fish under 6 inches in length and was not considered non-toxic to fish life. The fish treated by this process also carried a distinct odor which is characteristic of methylation of proteineous tissues, an oder not desired by fish or fishermen.

SUMMARY OF THE INVENTION

It is a primary object of this invention to provide a process for improving the freeze-thaw stability of fish bait by impregnating the fish with a water soluble, non-toxic glycol to replace a part of the water in the fish.

It is a further object of this invention to provide a process for impregnating herring and other fish bait with a water soluble, non-toxic glycol to improve their freeze-thaw stability.

These and other objects are carried out by immersing the fish bait in a solution containing a water soluble, non-toxic glycol and impregnating the fish bait by vacuum, pressure, or a combination of vacuum and pressure with the non-toxic glycol, the glycol replacing a part of the water in the fish. After treatment the fish bait are removed, drained and may be used as is or subsequently packed and frozen for future use.

DESCRIPTION OF THE PREFERRED EMBODIMENTS

Glycols, such as triethylene glycol, tetraethylene glycol, propylene glycol, diethylene glycol, glycerine, and glucose are known humectants and are known to retard the growth of bacteria.

What is important in the process of this application is replacing a part of the water in the fish bait with glycol by impregnating the bait by vacuum, pressure or a combination of vacuum and pressure. From experience gained in studying impounded herring and studying of winter and summer run herring, it was determined that the water content of the fish was important in the freeze-thaw characteristic of the herring. The application of humectants such as the ones described above under conditions of vacuum extends the freeze life of the bait after removal from refrigeration without softening of the flesh. This is believed to be due to the dilution of body fluids with the impregnated humectant which toughens up the flesh or which alters the chrystalinity of frozen tissue due to glycol exchange and fluid dilution.

The process is carried out by immersing the fish bait to be treated in a solution containing a water soluble, non-toxic glycol, glucose or other suitable carbohydrate contained in a closed vessel constructed to withstand vacuum, pressure or a vacuum-pressure combination up to 100 psi. The concentration of glycol in the treating solution and the time of treatment is not particularly critical and may range from 10 to 100% by volume, preferably about 40% by volume for a treatment time of from 10 minutes to 2 hours. After immersing the bait to be treated in the glycol solution contained in the vessel, the vessel is closed and vacuum or pressure applied to a time ranging from 3 to 30 minutes at a vacuum of about 28 inches mercury. During application of the vacuum, the vacuum may be temporarily relieved to create a pumping action and aid in impregnation of the fish with the glycol treating solution. Upon completion of the vacuum cycle, the fish bait may be removed and drained and frozen for future use or the bait may be subjected to pressure of from 20 to 100 psi for one to 20 minutes. After treatment the treating solution containing the glycol is drained from the fish bait and the bait packed and frozen for future use or used as is.

Bait which may be treated by the process of this invention include herring, mackerel, shrimp and other fish and crustations used for bait.

EXAMPLE I

About 20 pounds of freshly caught herring, four to six inches in length, were electrocuted by placing the herring in a vessel containing open electrodes connected to a 110 volt alternating current. The salt water in contact with the herring was sufficient to conduct electricity. The fish were allowed to remain in contact with the electrical current for about 20 seconds. Killing the herring by electrocution helped keep the scales from sloughing off. The electrocuted fish, (after draining excess water away), were placed in a six gallon bucket and completely immersed in a solution of 40% by volume triethylene glycol. The bucket containing the fish was then placed in a 10 gallon vessel constructed to withstand vacuum and pressure of 100 psi, the vessel equipped with a pressure relief valve and vacuum and pressure gages. The treatment vessel was closed and vacuum was applied for 10 minutes up to a vacuum of 28 inches mercury. Every two minutes, the relief valve was temporarily opened to break the vacuum to create a pumping action of the treating solution. Upon completion of the vacuum cycle 60 psi of air pressure was applied to the fish in the vessel for about 5 minutes. The fish were then removed, drained, packed and placed in refrigeration at about −25° F. The treating solution drained from the fish was monitored for glycol concentration and adjusted for reuse.

EXAMPLE II

The herring were processed as in Example I above using a 40% by volume solution propylene glycol rather than triethylene glycol.

EXAMPLE III

The herring were processed as in Example I above using a 40% by volume solution of glycerine rather than triethylene glycol.

EXAMPLE IV

The herring were processed as described in Example I above using, however, a 50% by volume glucose solution for the triethylene glycol solution.

EXAMPLE V

Four opelu, fresh caught and iced for 48 hours, were treated as described in Example I. Concurrently, two other opelu were frozen but not processed in accordance with Example I.

EXAMPLE VI

A frozen block of 100 pounds of large herring, six to eight inches in length received from Annette Island Packing Company, Annette Island, Alaska, were partially thawed and the best fish removed and processed as described in Example I. Another portion of the fish were refrozen to compare with the ones processed by the process described in this application. The remainder of the herring were thawed and rapidly disintegrated to a mush condition upon complete thawing. Many had stomach burns due to the enzymatic activity to their stomachs, the meld and roe.

EXAMPLE VII

Ghost shrimp and salt water shrimp were processed as described in Example I and frozen. A corresponding number of shrimp were not processed but were frozen for comparison.

The fish bait processed in accord with Examples I—VII, after two months of refrigeration, were thawed for examination. All of the specimens were frozen in polystyrene foam meat trays, six inches by eight inches. The specimens were allowed to remain at room temperature for one hour and were then examined for thaw, color naturalness, firmness and odor. The specimens were reexamined at hourly intervals up to four hours and then examined again after eight hours. The results are as follows:

|  | Processed | Un-processed |
|---|---|---|
| Example I (TEG) |  |  |
| Green Herring |  |  |
| 1 hour | firm | slightly soft |
| 2 hour | firm | slightly soft |
| 3 hour | firm | soft |
| 4 hour | firm | too soft |
| 5 hour | firm | mushy |
| 8 hour | firm (drying) | no good |
| Example II (Propylene Glycol) |  |  |
| Green Herring |  |  |
| 1 hour | shriveled a bit | — |
| 2 hour | firm(shriveled a bit) | — |
| 3 hour | firm(shriveled a bit) | — |
| 4 hour | firm(shriveled a bit) | — |
| 8 hour | firm(shriveled a bit) | — |
| Example III (Glycerine) |  |  |
| Green Herring |  |  |
| 1 hour | firm | — |
| 2 hour | firm | — |
| 3 hour | firm | — |
| 4 hour | firm | — |
| 8 hour | firm | — |
| Example IV (Glucose) |  |  |
| Green Herring |  |  |
| 1 hour | firm | — |
| 2 hour | firm | — |
| 3 hour | firm | — |
| 4 hour | slightly soft | — |
| 8 hour | soft | — |
| Example V (TEG) |  |  |
| Opelu |  |  |
| 1 hour | firm | firm |
| 2 hour | firm | soft |
| 3 hour | firm | too soft |
| 4 hour | firm | too soft |
| 8 hour | slightly soft | no good |
| Example VI (TEG) |  |  |
| Reprocessed Alaska Herring |  |  |
| 1 hour | firm | soft |
| 2 hour | firm | mushy |
| 3 hour | firm | mushy |
| 4 hour | firm | no good |
| 8 hour | firm (drying) | no good |
| Example VII (TEG) |  |  |
| Ghost shrimp |  |  |
| 1 hour | firm | slightly soft |
| 2 hour | firm | slightly soft |
| 3 hour | firm | slightly soft |
| 4 hour | firm | soft |
| 8 hour | soft | no good |
| Salt water shrimp |  |  |
| 1 hour | firm | firm |
| 2 hour | firm | firm |
| 3 hour | firm | slightly soft |
| 4 hour | firm | slightly soft |
| 8 hour | slightly soft | soft (could detect odor) |

From the above examples, it can be seen that processing of fish bait as described yields a definite improvement in the freeze-thaw stability of the specimens. Bacterial decay is retarded on the surface of the specimens. It has been noted that herring which have been processed by the process of this invention and left in the open after thawing for four hours or more can be refrozen and reused after thawing. This effects a great savings for those fishermen, both commercial and sport fishermen, in the cost of fish bait.

The embodiments of the invention in which a particular property or privilege is claimed are defined as follows:

1. A process for the preparation of a fish bait and improving the freeze-thaw stability of fish bait without substantial dehydration thereof consisting essentially of:
   immersing the fish bait in a water solution containing 20% to 60% by volume of a water soluble, non-toxic glycol selected from the group consisting of triethylene glycol, diethylene glycol, tetraethylene glycol, propylene glycol, dipropylene glycol and glycerine, applying a vacuum up to 28 inches mercury to the water solution containing the fish bait for a period of time ranging from 3 to 30 minutes, then applying pressure to the water solution containing the fish bait of from 40 to 100 psi for a period of time ranging from 1 to 10 minutes, and removing the fish from the water solution for packing and freezing.

2. The process of claim 1 wherein, during application of vacuum to the water solution, the vacuum is temporarily relieved at periodic intervals to create a pumping action on the water solution to aid in impregnation of the fish bait with the water solution.

3. The process of claim 1 wherein the glycol is triethylene glycol.

* * * * *